March 30, 1926.  1,578,976
A. FOWBLE
SHOCK ABSORBER
Filed March 28, 1925
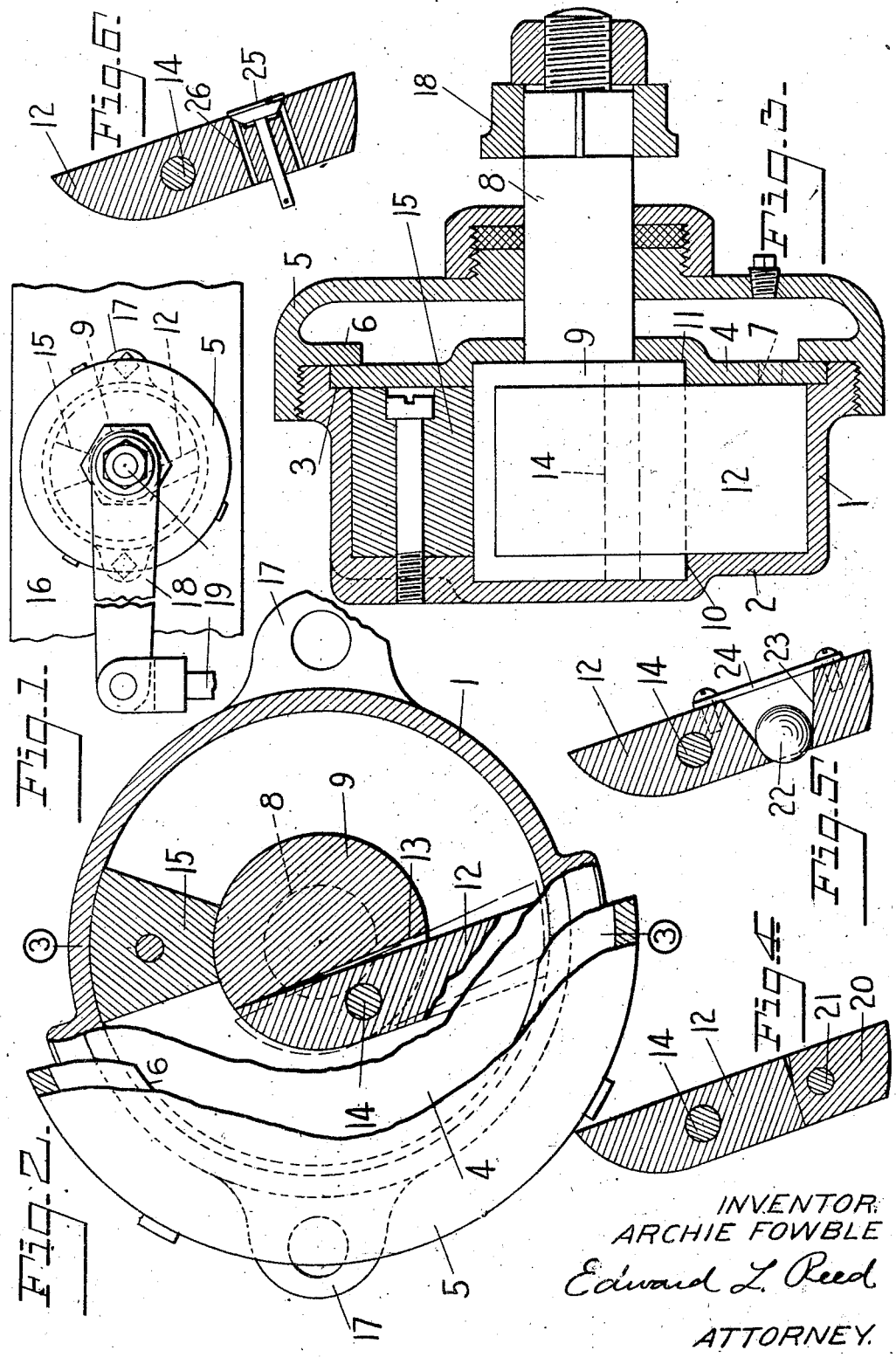
INVENTOR:
ARCHIE FOWBLE
Edward L. Reed
ATTORNEY.

Patented Mar. 30, 1926.

1,578,976

UNITED STATES PATENT OFFICE.

ARCHIE FOWBLE, OF DAYTON, OHIO.

SHOCK ABSORBER.

Application filed March 28, 1925. Serial No. 18,984.

*To all whom it may concern:*

Be it known that I, ARCHIE FOWBLE, a citizen of the United States, residing at Dayton, in the county of Montgomery and State of Ohio, have invented certain new and useful Improvements in Shock Absorbers, of which the following is a specification, reference being had therein to the accompanying drawing.

This invention relates to shock absorbers and more particularly to a shock absorber of the fluid controlled type for use on motor vehicles and the like.

Shock absorbers of this type usually comprise a piston, the movement of which is controlled by a body of fluid and means are provided for opening and closing a passageway through or about the piston so as to permit free movement of the piston or to cause the same to move against the resistance of the fluid. In all shock absorbers of this type with which I am familiar it is necessary to impart operative movement to the piston, that is movement against the action of the fluid, before the passageway can be opened or closed, thus the initial portion of what should be the free movement of the piston is resisted by the fluid and the initial portion of what should be the controlled movement of the piston is free.

One object of the present invention is to provide a fluid controlled shock absorber in which the passageway about the piston will be opened or closed before operative movement is imparted to the piston.

A further object of the invention is to provide a fluid controlled shock absorber of the oscillatory type having a wing piston which will be moved lengthwise toward or from the circumferential wall of the cylinder before transverse movement is imparted thereto.

A further object of the invention is to provide such a shock absorber which will be of a simple inexpensive construction and of a very strong durable character.

Other objects of the invention will appear as the device is described in detail.

In the accompanying drawings Fig. 1 is a side elevation of a shock absorber embodying my invention; Fig. 2 is a plan view of the cylindrical casing, partly broken away to show the shaft and piston in section; Fig. 3 is a section taken on the line 3—3 of Fig. 2; and Figs. 4, 5 and 6, are views of modified forms of pistons having relief valves.

In these drawings I have illustrated one embodiment of my invention and have shown the same as designed primarily for use on a motor vehicle but it will be understood that the invention may take various forms and may be utilized for various purposes.

In that embodiment of the invention here shown the shock absorber comprises a cylindrical casing 1 having its inner end wall 2 formed integral therewith and having the outer edge of its circumferential wall provided with an annular recess 3 which forms a seat for a transverse partition or plate 4 which constitutes the outer head of the cylinder. Mounted on the outer portion of the casing 1 is a cap 5 which, in the present instance, is screw threaded onto the circumferential wall of the casing and is provided with an inwardly extending annular flange 6 which overlaps the recess 3 and plate 4 so as to clamp the latter firmly on its seat. The transverse or outer wall of this cap is spaced from the cylinder head 4 to provide a reservoir for the storage of a reserve quantity of liquid and this reservoir communicates with the cylinder formed in the body of the casing 1 through a passageway 7 so as to maintain a constant supply of liquid in the cylinder. As here shown, the passageway 7 is uncontrolled but obviously it may be provided with a check valve if desired. Journaled in the cap 5 and wall 4 is a shaft 8, the inner end portion of which extends across the cylinder and is provided with an enlarged or hub portion 9, the ends of which are seated in recesses 10 and 11 formed in the inner faces of the walls 2 and 4. Arranged within the cylinder is a blade or wing piston 12 which extends substantially tangential to the shaft and is so connected therewith that it will be moved lengthwise toward or from the cylindrical wall of the cylinder before it is moved transversely to its length. Consequently when the shaft is moved in one direction the piston will be moved away from the wall to provide a passageway between the wall and the end of the piston before oscillatory or operative movement is imparted to the piston, and when the shaft is moved in the opposite direction the piston will be moved outwardly to close this passageway before operative or oscillatory movement is imparted to the piston. In the present construction, the hub 9 of the shaft is cut away on one side to provide a recess 13 in which the inner end portion of the piston 12 is pivotally mounted, the connection being established by means of a pivot pin 14 extending through the piston and seated at its ends in the end walls of the recess, the axis being parallel with but spaced from the axis of the shaft. The inner face of the piston is spaced from the inner wall or face of the recess 13 so that the piston may have a limited movement about its axis with relation to the shaft. The axis of the piston is so arranged that the initial rotation of the shaft will impart lengthwise movement to the piston before the piston is caused to rotate with the shaft. Preferably the axis of the piston is arranged in a radial line spaced approximately ninety degrees from the radial line in which the outer end of the piston is located. It will be obvious that this spacing will vary because of the relative movements of the piston and the shaft. As a result of this construction it will be apparent that with the parts in the position shown in Fig. 2 the initial movement of the shaft in a clockwise direction will impart lengthwise movement to the piston to move the outer end thereof away from the circumferential wall of this cylinder before transverse or oscillatory movement is imparted to the piston. The amount of this lengthwise movement of the piston is limited by the space between the face of the piston and the inner wall of the recess 13. When the shaft is moved with relation to the piston such a distance that this wall will come in contact with the face of the piston the latter is caused to rotate with the shaft about the axis of the latter. Likewise when the shaft is rotated in a counter-clockwise direction the piston will be moved outwardly in a straight line toward the circumferential wall of the cylinder until the inner wall of the recess contacts with the inner end portion of the piston, which extends some distance beyond its axis. The space between the hub 9 and the walls of the cylinder is divided by the usual abutment 15. In the present construction no special outlet has been provided for the escape of the liquid when the piston is moved to the left in Fig. 2 but the leakage about the several joints will permit the escape of the liquid in sufficient quantities to permit the desired movement of the piston.

In practice the casing is mounted on the frame of an automobile, as shown at 16, and it is here shown as provided with bolt receiving lugs 17 for this purpose. Rigidly connected to the outer end of the shaft 8 is an actuating arm 18 with which is pivotally connected a link or connecting rod 11 the opposite end of which connects with the axle of the automobile in the usual manner.

The operation of the device will be readily understood from the foregoing description and it will be apparent that upon the downward movement of the frame of the vehicle with relation to the axle the piston will first be actuated to open the passageway between the same and the wall of the cylinder but will then move with the shaft. Upon the upward movement or rebound of the frame, the piston will move out instantly into contact with the circumferential wall of the cylinder and will then be moved with the shaft and the resistance offered by the liquid in the cylinder to the movement of the piston will check the rebound. Because of the movement of the shaft which is necessary to open and close the passageway it will be further apparent that the arm 18 will be capable of a limited amount of movement in one direction or the other before the piston becomes operative and consequently the body of the automobile will be permitted to have its usual or normal movement with relation to the axle without being affected by the shock absorber and the shock absorber will become operative only upon excessive movement of the body with relation to the axle.

In Figs. 4, 5 and 6, I have shown modified forms of pistons 12 which are provided with relief valves. The additional relief for the liquid is advantageous in cold countries or when it is desirous to use a heavy oil. In Fig. 4 the relief valve consists of a flap pivoted at 21. In Fig. 5 the relief valve is a ball 20 seated in a pocket 23 and retained therein by a strap 24. In Fig. 6, the relief valve 25 is of the poppet type and is adapted to close ports 26.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a shock absorber, a cylindrical casing, a shaft mounted in said casing, and a wing piston mounted in said casing and connected with said shaft for oscillatory movement therewith, the connection between said wing piston and said shaft being such that the initial movement of said shaft will move said piston in the direction of its length before oscillatory movement is imparted thereto.

2. In a shock absorber, a cylindrical casing, a shaft rotatably mounted in said casing and arranged axially thereof, a wing piston mounted in said casing, and means for causing said shaft to first impart lengthwise movement to said piston and then to move said piston transversely to its length.

3. In a shock absorber, a cylindrical casing, an axial shaft journaled in said casing, a wing piston, and means for pivotally connecting said piston with said shaft on an axis parallel with but spaced from the axis of said shaft.

4. In a shock absorber, a casing, an axial shaft journaled in said casing and having a hub portion, said hub portion having one side partially cut away to form a recess, a wing piston pivotally mounted in said recess on an axis parallel with but spaced from the axis of said shaft, the face of said piston being spaced from the inner wall of said recess to permit said piston to have pivotal movement with relation to said hub.

5. In a shock absorber, a cylindrical casing, an axial shaft journaled in said casing, a wing piston arranged within said casing and pivotally connected with said shaft, the axis of said pivotal connection being arranged in a radial line spaced substantially ninety degrees from the radial line in which the outer end of said piston is arranged.

6. In a shock absorber, a cylindrical casing, an axial shaft journaled in said casing, a wing piston arranged within said casing and pivotally connected with said shaft at a point spaced from the axis thereof, the axis of said pivotal connection being arranged in a radial line extending transversely to said piston, said piston having means for limiting the pivotal movement of said piston with relation thereto.

7. In a shock absorber, a cylindrical casing, an axial shaft journaled in said casing, a wing piston arranged within said casing, and means for causing the initial movement of said shaft to move said piston toward or from the wall of said casing and to cause the subsequent movement of said shaft to impart transverse movement to said piston about the axis of said shaft.

8. In a shock absorber, a cylindrical casing, a shaft mounted in said casing, a wing piston mounted in said casing and connected with said shaft for oscillatory movement therewith, the connection between said wing piston and said shaft being such that the initial movement of said shaft will move said piston in the direction of its length before oscillatory movement is imparted thereto, and a relief valve for said piston.

9. In a shock absorber, a cylindrical casing, a shaft rotatably mounted in said casing and arranged axially thereof, a wing piston mounted in said casing, means for causing said shaft to first impart lengthwise movement to said piston and then to move said piston transversely to its length, and a relief valve for said piston.

10. In a shock absorber, a cylindrical casing, an axial shaft journaled in said casing, a wing piston, means for pivotally connecting said piston with said shaft on an axis parallel with but spaced from the axis of said shaft, and a relief valve for said piston.

In testimony whereof, I affix my signature hereto.

ARCHIE FOWBLE.